G. A. SMITH.
GREASE DETAINING DEVICE.
APPLICATION FILED NOV. 30, 1917.
1,327,173.
Patented Jan. 6, 1920.
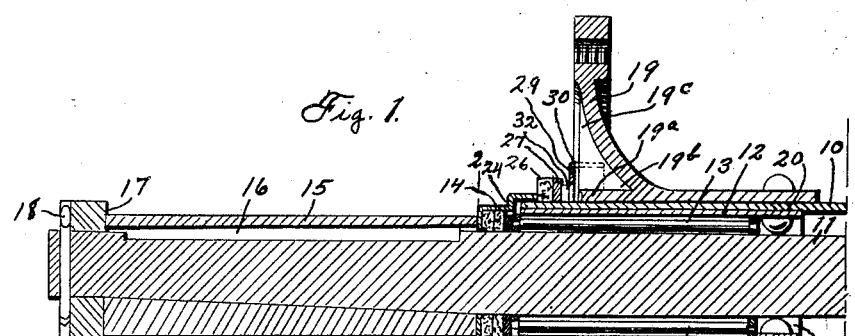
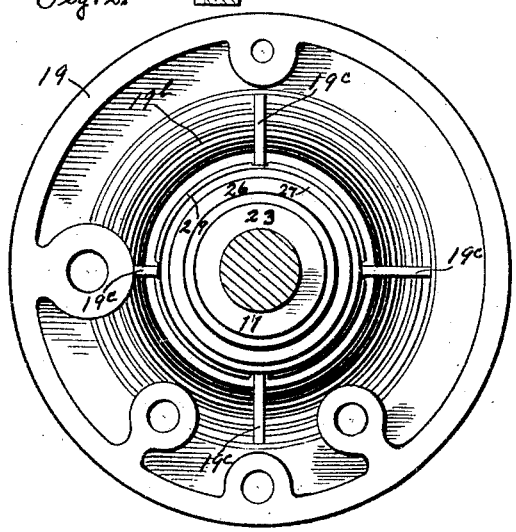
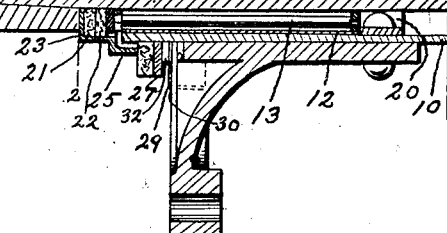
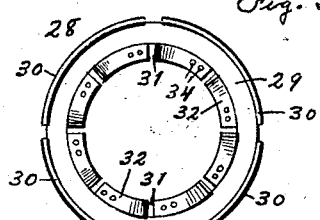
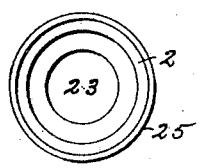
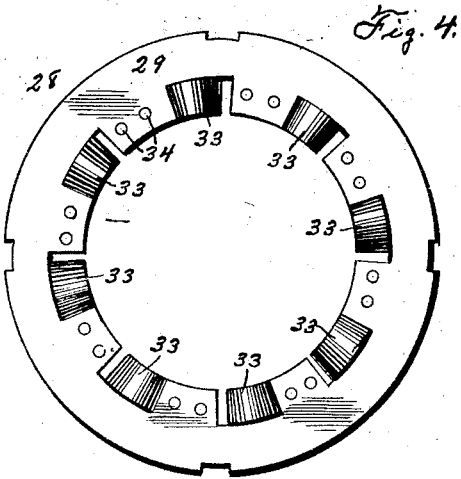
INVENTOR:
GILBERT A. SMITH

UNITED STATES PATENT OFFICE.

GILBERT A. SMITH, OF DES MOINES, IOWA.

GREASE-DETAINING DEVICE.

1,327,173.    Specification of Letters Patent.    Patented Jan. 6, 1920.

Application filed November 30, 1917. Serial No. 204,800.

*To all whom it may concern:*

Be it known that I, GILBERT A. SMITH, a citizen of the United States of America, and resident of Des Moines, Polk county, Iowa, have invented a new and useful Grease-Detaining Device, of which the following is a specification.

The object of this invention is to provide improved means for preventing grease or oil from traveling along a shaft or axle.

A further object of this invention is to provide improved means for limiting the travel of grease within an axle housing in either direction from a differential mechanism.

A further object of this invention is to provide improved means for preventing grease from being discharged to a wheel from an axle housing.

My invention consists in the construction, arrangement and combination of elements hereinafter set forth, pointed out in my claims and illustrated by the accompanying drawing, in which—

Figure 1 is a longitudinal section showing my improved device mounted as required for practical use in connection with common elements of a rear axle shown conventionally, some common elements being omitted to economize space and in the interest of clearness. Fig. 2 is a cross-section on the indicated line 2—2 of Fig. 1. Fig. 3 is a face view of a yielding pressure device employed in my improved construction. Fig. 4 is an opposite face view on an enlarged scale, of the device shown in Fig. 3. Fig. 5 is an inner face view of an axle housing cap employed in my improved construction.

In the construction of the device as shown the numeral 10 designates an axle housing, 11 an axle shaft, 12 a roller bearing sleeve, 13 a roller bearing, 14 an axle roller bearing steel washer, 15 a skein, 16 a key, 17 a castle nut and 18 a cotter pin such as are commonly employed in the rear axle construction of an automobile or motor driven vehicle, which employs a differential mechanism, means for mounting a driving wheel on the skein 15 and means for mounting a brake drum and supporting devices, the latter being designated in part by the element 19 on the axle housing, which driving wheel also is omitted from these drawings. A common collar 20 also is mounted in the axle housing 10 and the inner end portions of the roller bearing sleeve 12 and roller bearing assembly 13 abut said collar. The axle roller bearing steel washer 14 is mounted loosely on the axle 11 and abuts the outer end of the roller bearing assembly 13. Elastic washers 21, 22, as commonly used, are mounted in sequence on the axle 11 outside of and one of them in contact with the steel washer 14. An axle housing cap 23 (Fig. 5) is mounted loosely on the axle and is formed with an annular wall or flange overlying and loosely embracing the elastic washer 22 and the steel washer 14. The axle housing cap is formed with an inner end portion of greater diameter than its outer end portion and comprising a peripheral flange 24 and an annular rim 25 perpendicular to the flange 24, which flange is spaced from the outer ends of the axle housing 10 and bearing sleeve 12 and is adapted to surround and loosely engage said outer end portion of the axle housing. An elastic washer 26 is mounted on and fits snugly to the outer end portion of the axle housing 10 and is adapted to receive the inner end of the rim 25 of the axle housing cap. A steel washer 27 is mounted loosely on the outer end portion of the axle housing 10 and abuts the inner face of the elastic washer 26. A yielding pressure device 28 (Figs. 3 and 4) is mounted loosely on the axle housing 10 and abuts the inner face of the steel washer 27. The member 19 as usually constructed is formed with an annular, central collar portion 19$^a$ surrounded by an annular groove 19$^b$ of conical shape, which groove is intersected at regular intervals such as on its quarters by strengthening ribs 19$^c$ (Fig. 2). The yielding pressure device preferably is formed of sheet metal by stamping or pressing and is composed of a body ring 29 having segmental flange members 30 formed on its periphery and perpendicular to its transverse plane. A plurality of notches 31 are formed in the inner wall of the body ring 29 and leaf springs 32 are fixed to the inner portions of said body ring and are arched over said notches and extend beyond the outer face of said ring, the outwardly projecting arched portions of said leaf springs being designated specifically by the numerals 33 in Fig. 4. The yielding pressure device is mounted in such manner that the body ring contacts at its inner face with the ribs 19ᶜ and the notches or spaces between the segmental flanges 30 receive said ribs so that said flanges overlap the ribs and prevent rotation of the device relative to the member 19. Rivets 34 employed to secure the leaf springs 32 to the ring 29 also abut the adjacent end of the collar portion 19ᵃ of the member 19, thus backing the yielding pressure devices rigidly. The outwardly arched portions 33 of the leaf springs impinge the steel washer 27 and apply pressure through said washer to the elastic washer 26, tending to resist pressure of the rim 25 to the end that said rim is received within the elastic washer and forms a seal therewith. The skein 15 abuts the elastic washer 21 located between it and the axle housing cap 23 and in turn is pressed inwardly by the castle nut 17 screwed on the outer end of the axle and retained against accidental loosening by the cotter pin 18.

In practical use any lubricating material such as grease contained in the differential gear case or hard oil contained in a grease cup mounted on the axle housing and adapted to supply the roller bearing assembly 13 is retained and detained against leakage to the spindle and brake members as follows: Through the use of the elastic washers 21, 22 compressed between the axle skein 15, housing cap 23 and steel washer 14 and thereby expanded laterally into oil-sealing engagement with the axle and housing cap as is now commonly used and further through the use of the elastic washer 26 compressed between the rim 25 and steel washer 27 by expansion of the leaf spring portions 33. It is on the latter seal that dependence must be placed for effectual prevention of leakage to the brake members and experiment has demonstrated that yielding pressure devices are indicated to maintain the seal under all conditions and circumstances. Heretofore it has been common to use an axle housing cap fitting tightly to the axle housing and requiring the exercise of considerable force and the use of tools in removing and replacing the same with the result that such axle housing cap frequently is damaged by being bent to such an extent that leakage of oil past it naturally follows its further use. The construction above set forth avoids all damage to the axle housing cap by providing a form thereof fitting loosely to the axle housing and adapted to be removed and replaced readily by hand and without the use of tools; the dependence heretofore vainly placed on the tight fit of the cap and housing being transferred in the interest of effectiveness and as a marked improvement to the connection between the inner end of said cap and an elastic washer backed by yielding pressure devices tending to maintain such connection as a complete seal against the passage of oil.

It is to be understood that the leaf springs 32 may be formed of the same material and integrally with the ring body 29 or in other words the yielding pressure device may be a unitary one-piece structure embodying the various functions and characteristics ascribed to the structure as described.

I claim as my invention—

1. A grease-detaining device, comprising an axle housing cap adapted loosely to fit a housing, an elastic washer adapted to surround a housing and receive and engage with one end of said cap, and yielding pressure devices backed by said housing and adapted to apply pressure to said elastic washer toward said cap.

2. A grease-detaining device, comprising, in combination with an axle housing, axle and roller bearing assembly, a housing cap loosely mounted on said axle and loosely surrounding one end portion of said housing, elastic washers mounted on said housing within and outside said cap, a metal washer mounted on said axle between the roller bearing assembly and an elastic washer, an elastic washer mounted on said housing and adapted to receive and be engaged by the inner end of said cap, and yielding pressure devices backed by said housing and adapted to apply pressure on the latter elastic washer.

3. A grease-detaining device, comprising, in combination with an axle housing, axle and roller bearing assembly, a housing cap loosely mounted on said axle and loosely surrounding one end portion of said housing, elastic washers mounted on said housing within and outside said cap, a metal washer mounted on said axle between the roller bearing assembly and an elastic washer, an elastic washer mounted on said housing and adapted to receive and be engaged by the inner end of said cap, a metal washer mounted on said housing and engaging the latter elastic washer, and yielding pressure devices backed by said housing and impinging the latter metal washer, whereby the latter elastic washer is held in sealing engagement with said cap.

4. In a grease-detaining device, a yielding pressure device comprising a ring and leaf springs on said ring.

5. In a grease-detaining device, a yielding pressure device comprising a flat ring formed with notches opening toward its center, and leaf springs mounted on said ring, extending across and arched partially through said notches.

6. In a grease-detaining device, a yielding pressure device comprising a flat ring formed with notches opening toward its center, leaf springs mounted on said ring, extending across and arched partially through said notches, and segmental flanges formed on the periphery of said ring and spaced apart.

7. In a grease-detaining device, a yielding pressure device comprising a metal ring having notches extending toward its center and also having spring members arched from said notches.

GILBERT A. SMITH.